(12) United States Patent
Klein et al.

(10) Patent No.: US 8,223,702 B2
(45) Date of Patent: Jul. 17, 2012

(54) METHOD FOR TRANSMITTING DATA IN PACKETS IN A RADIO COMMUNICATIONS SYSTEM

(75) Inventors: Axel Klein, München (DE); Jörn Krause, Berlin (DE); Ingo Viering, München (DE); Malgorzata Wimmer, Wroclaw (PL)

(73) Assignee: Siemens Aktiengesellschaft, Munich (DE)

( * ) Notice: Subject to any disclaimer, the term of this patent is extended or adjusted under 35 U.S.C. 154(b) by 770 days.

(21) Appl. No.: 12/279,261

(22) PCT Filed: Jan. 25, 2007

(86) PCT No.: PCT/EP2007/050711
§ 371 (c)(1),
(2), (4) Date: Dec. 24, 2008

(87) PCT Pub. No.: WO2007/093486
PCT Pub. Date: Aug. 23, 2007

(65) Prior Publication Data
US 2009/0245186 A1 Oct. 1, 2009

(30) Foreign Application Priority Data
Feb. 13, 2006 (EP) .................. 06002846

(51) Int. Cl.
*H04W 4/00* (2009.01)
(52) U.S. Cl. ....................................... 370/329
(58) Field of Classification Search .......... 370/329, 370/335, 256, 331, 441, 345, 278, 282, 341, 370/348, 349, 431, 336, 436, 277; 455/13.4, 455/206
See application file for complete search history.

(56) References Cited

U.S. PATENT DOCUMENTS

| | | | |
|---|---|---|---|
| 6,377,810 B1 * | 4/2002 | Geiger et al. | 455/456.2 |
| 7,808,953 B2 * | 10/2010 | Kuroda et al. | 370/335 |
| 2004/0258096 A1 | 12/2004 | Yoon et al. | |
| 2004/0264420 A1 | 12/2004 | Qian et al. | |

FOREIGN PATENT DOCUMENTS
WO    WO2007/023022    3/2007

OTHER PUBLICATIONS

Tao Chen, et al., "CDMA2000® Revision D Reverse Link Enhancements," IEEE, 2004, pp. 2642-2647.
3GPP TS 25.309 V6.5.0 (Dec. 2005) "FDD Enhanced Uplink," 2005, pp. 1-34.
3GPP TS 25.211 V6.70 (Dec. 2005), "Physical Channels and Mapping of Transport Channels Onto Physical Channels (FDD)," 2005, pp. 1-50.

* cited by examiner

*Primary Examiner* — Chi Pham
*Assistant Examiner* — Alexander Boakye
(74) *Attorney, Agent, or Firm* — Staas & Halsey LLP

(57) ABSTRACT

The subject matter relates to a method for transmitting data in packets in a radio communications system, according to which the receipt of data packets from at least two terminals is confirmed by a base station of the radio communications. The confirmation of receipt takes place without an overlap in time, using identical resources.

10 Claims, 3 Drawing Sheets

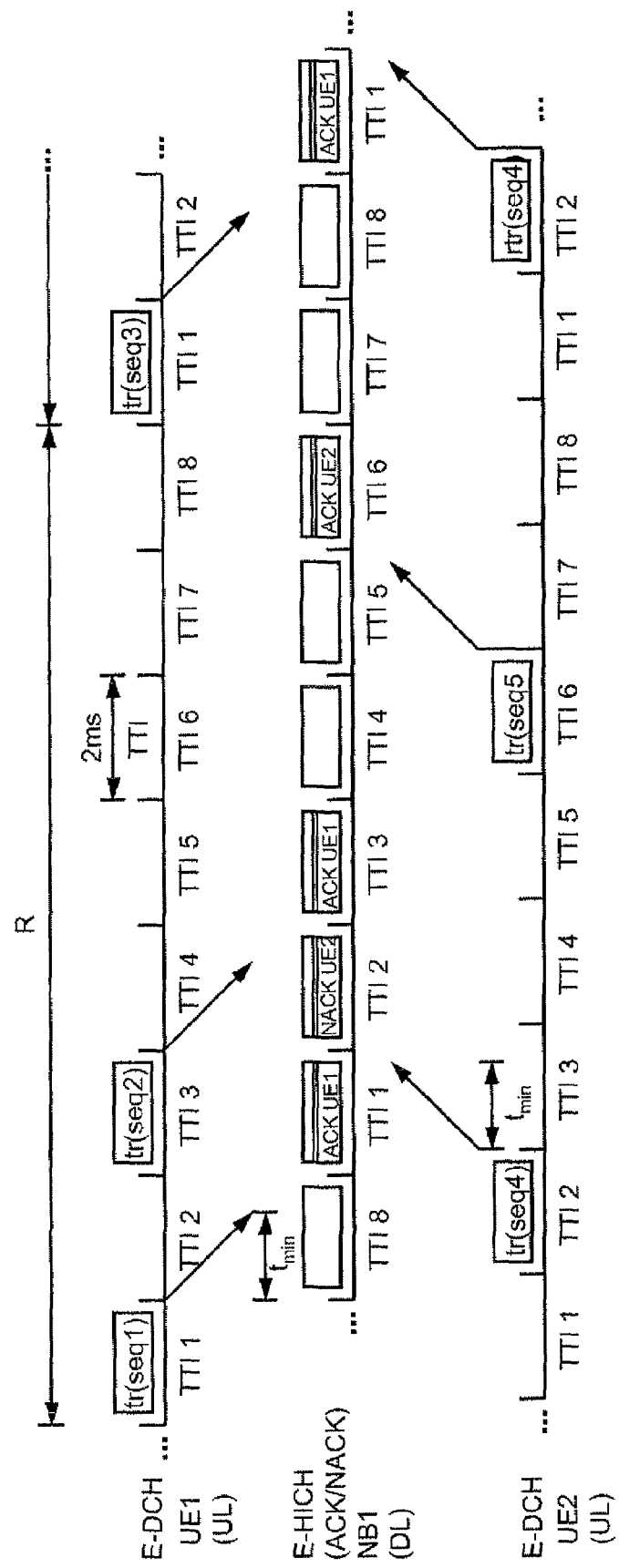

METHOD FOR TRANSMITTING DATA IN PACKETS IN A RADIO COMMUNICATIONS SYSTEM

CROSS REFERENCE TO RELATED APPLICATIONS

This application is based on and hereby claims priority to International Application No. PCT/EP2007/050711 filed on Jan. 25, 2007, and European Patent Application No. EP06002846, filed Feb. 13, 2006, the contents of both of which are herein incorporated by reference.

BACKGROUND

The embodiments relate to a method as well as to system components for transmitting data in packets in a radio communications system.

Third generation radio communications systems (3G), in particular the UMTS (Universal Mobile Telecommunications System), which is standardized within the scope of 3GPP (3rd Generation Partnership Project), are increasingly moving toward the packet-oriented transmission of data and, in particular, voice for a more efficient use of the radio frequency resources which have a limited availability.

In this context, extensions to the UMTS standard HSDPA (High Speed Downlink Packet Access) and HSUPA (High Speed Uplink Packet Access), also known as E-DCH (Enhanced Dedicated Channel), were specified for instance. The E-DCH has a plurality of so-called control channels here, such as are described inter alia in more detail in the technical specification 3GPP TS 25.309 V6.5.0 "FDD Enhanced Uplink; Overall description; Stage 2 (Release 6)". By way of example, the E-DCH has the so-called E-HICH-channel, which is transmitted in the downlink direction DL and contains positive and/or negative confirmations, so-called ACK/NACK (acknowledged/not acknowledged) signalings for data packets sent in the uplink direction UL. The E-DCH also has the so-called E-RGCH channel, which contains relative confirmations and/or scheduling commands for a group of terminals in the downlink direction. These two control channels are considered in more detail below, however further channels known to the person skilled in the art, in which the embodiments can be deployed advantageously, are included within the scope herein.

If the afore-described channels are to be used within the scope of a transmission of voice data for instance, in the form of a VoIP service (Voice over Internet Protocol) for instance, or also for other packet data services with a comparatively low data rate, this disadvantageously results, according to the current configuration of these channels, in a significant additional loading of the limited radio resources. By way of example, a dedicated resource of the E-HICH channel is currently assigned to each user of the E-DCH. This user-specific resource consists, in the example of the E-HICH, of a combination of a spreading code with spreading factor 128 and one of 40 possible orthogonal signatures. According to technical specification 3GPP TS 25.211 V6.7.0 "Physical Channels and Mapping of Transport Channels onto Physical Channels (FDD) (Release 6)", an information bit can as a result be transmitted simultaneously to up to 40 users in each instance and clearly assigned to the respective receivers. In the case of the E-HICH, the above-described statuses ACK/NACK are signaled in this way with each bit for a specific user of the E-DCH.

The same method and the same resources are also used for the above-mentioned E-RGCH, with, in this case, an E-RGCH also not necessarily being assigned to each user and/or a common E-RGCH being assigned to a respective group of users, i.e. the users of this group adhere to the same relative confirmation commands. In the instance, however, that the user is assigned both an E-HICH as well as an E-RGCH, this indicates a further restriction to the user who is addressable by each physical channel and/or spreading code, i.e. a physical channel is to be provided for each 20 users.

For above-mentioned services, such as VoIP or a low-rate packet data transmission to a large number of users, this would, however, mean that five spreading codes alone have to be assigned to 100 users for instance for the transmission of signaling confirmations, which results in a significant restriction in the transmission capacity for the user data transmission in the downlink direction.

SUMMARY

An aspect of the embodiments is to specify a method as well as system components of a radio communications system, which enable a more efficient use of the radio resources which have a limited availability.

In accordance with the embodiments, a method is proposed for transmitting data in packets in a radio communications system, in which data packets received from at least two terminals is confirmed by a base station of the radio communications system, with the confirmation of the receipt taking place without an overlap in time, using identical resources.

The embodiments advantageously utilize the fact that voice data only accumulates approximately every 20 ms as a result of the known voice coding, so that a transmission via the radio interface also theoretically need only take place every 20 ms. In the exemplary E-DCH mentioned above, a so-called transmission time interval (TTI) has a length of 2 ms. VoIP packets with voice data, which correspond to a length of 20 ms in each instance, can be transmitted in such a TTI in each instance, if an adequately compressing voice coding as well as a compressing of headers of IP packets takes place. Only $1/10$ of the radio resources are thus theoretically used by a user for the transmission of VoIP data and correspondingly only $1/10$ of the user-specific assigned resources of the E-HICH are theoretically also required for the transmission of confirmations. This situation allows for the inventive use of resources for instance of the E-HICH according to a time multiplexing method by a plurality of users and thus advantageously a more efficient use of radio resources in the downlink direction. To this end, transmissions also take place synchronously in the downlink direction and a time multiplexing method can thus be used optimally in the absence of superimpositions of signals. A single physical resource for a transmission of confirmations in the downlink direction may in turn theoretically be adequate in this way in the case of the above-mentioned exemplary 100 users.

According to a first development, the resource for confirmation is embodied as a signature.

According to a second development, at least one bit position or a code sequence in a time interval of a time frame is used as a resource for confirming the receipt of the data packets of at least two terminals.

According to a third development, the data packets of the at least two terminals are transmitted in an identical physical resource without an overlap in time or in a temporally overlapping fashion.

According to a fourth development, at least one time interval of a frame is assigned to the at least two terminals for the transmission of the data packets. According to a development based hereupon, the respective time intervals for the transmission of data packets from a radio network controller and/or the base station are assigned to the at least two terminals in a coordinated fashion such that a confirmation of the receipt can take place without an overlap in time using identical resources. According to a further development based hereupon, the at least two terminals are assigned the time intervals for the transmission of data packets to an identical temporal position in at least two consecutive frames.

A base station of a radio communications system has at least one transmitting/receiving facility for receiving data packets from at least two terminals and for transmitting confirmations of the receipt, as well as a control facility for controlling a transmission of the confirmations without an overlap in time, in an identical resource.

According to a development of the inventive base station, the control facility is also designed to assign resources to the at least two terminals for the transmission of data packets in the uplink direction as well as to assign identical resources for the transmission of confirmations in the downlink direction to the at least two terminals.

In a radio communications system having at least one base station, a radio network controller and two terminals, the radio network controller has at least one control facility for assigning resources to the at least two terminals for the transmission of data packets in the uplink direction to the base station, as well as a transmitting/receiving facility for transmitting the assignment to the at least two terminals and/or the base station. The at least two terminals each have at least one control facility for controlling a transmission of data packets in the assigned resources by a transmitting/receiving facility and the base station has at least one transmitting/receiving facility for receiving data packets of the at least two terminals and for transmitting confirmations of the receipt, and a control facility for controlling a transmission of the confirmations without an overlap in time in an identical resource.

All the components of a radio communications system can naturally comprise additional facilities which have not been mentioned and are however known to the person skilled in the art for implementing the method.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 shows an exemplary transmission of data by two terminals by the common use of a confirmation signature in a confirmation channel and FIG. 3 shows a further exemplary transmission of data by two terminals by the common use of a confirmation signature in a confirmation channel.

DETAILED DESCRIPTION OF THE PREFERRED EMBODIMENT

Figure 1:
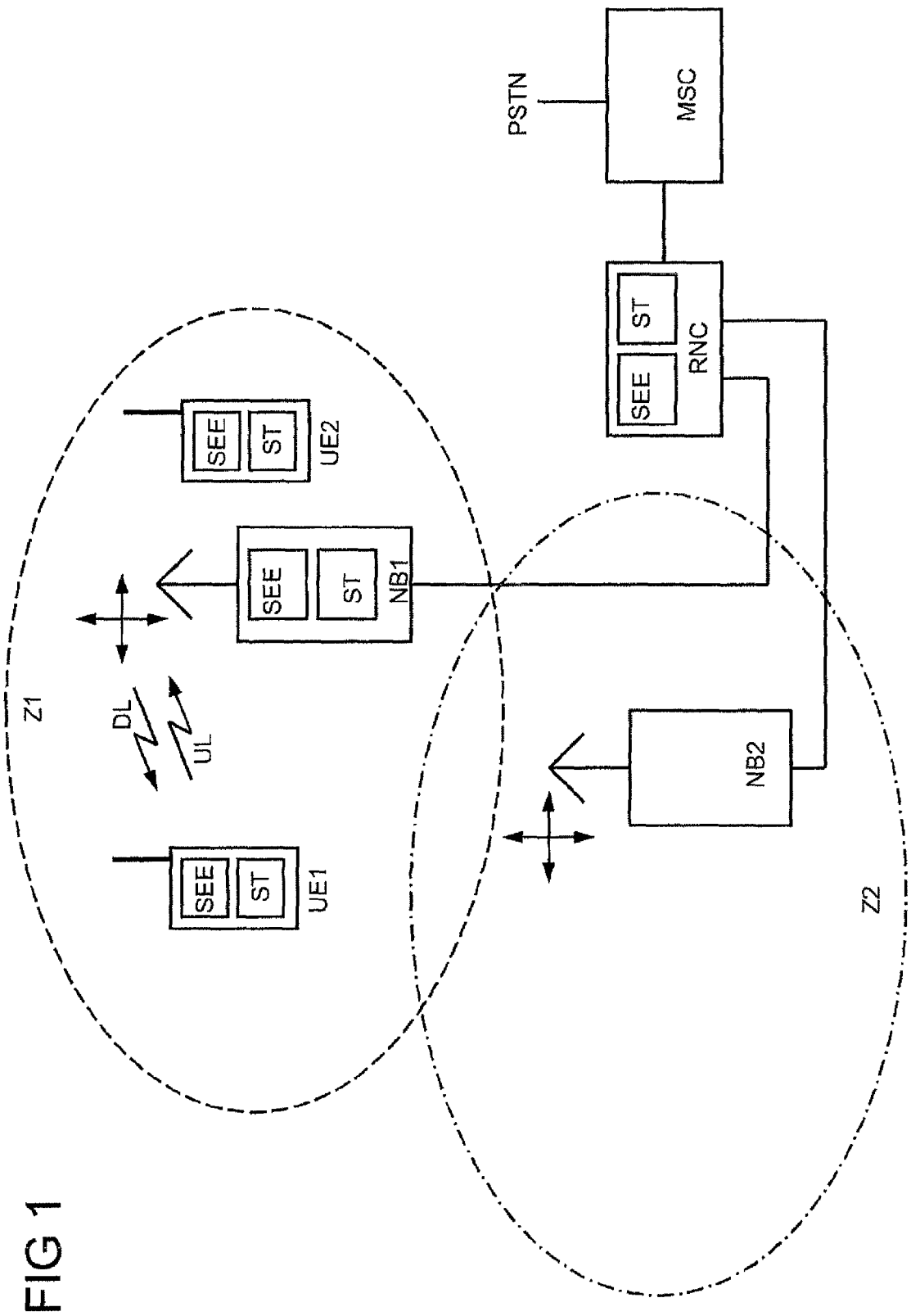
FIG. 1 shows a block diagram of a radio communications system based on the UMTS standard

Reference will now be made in detail to the preferred embodiments, examples of which are illustrated in the accompanying drawings, wherein like reference numerals refer to like elements throughout.

FIG. 1 shows an exemplary simplified structure of a radio communications system according to the known UMTS standard, with a realization of the method in radio communications systems being possible in an identical fashion according to other standards, for instance the so-called evolution of the UMTS standard (E-UTRA or LTE (Long Term Evolution)), which is likewise specified within the scope of 3GPP.

The structure of a radio communications system according to the UMTS standard includes one or several mobile switching centers MSC, which implement a switching of so-called circuit-switched connections as well as a management of different functionalities of the system. The mobile switching center MSC also adopts the function of the transition to the public switched telephone network PSTN. Aside from the mobile switching center, so-called gateways, SGSN and/or GGSN (not shown) exist, which allow a transition into networks with packet-oriented transmission, for instance the internet.

A plurality of radio network controllers RNC are connected to the mobile switching center MSC and/or gateways, in which physical resources of the radio interface are managed inter alia. A plurality of base stations NB1, NB2 (Node B) are connected in turn to a radio network controller RNC, which can set up and release connections to the terminals UE1, UE2 (User Terminal) using assigned physical resources of the radio interface. Each base station NB1, NB2 supplies the assigned physical resources in each instance to at least one geographical area, which is also referred to as radio cell Z1, Z2. The transmission to the radio interface takes place both in the uplink direction UL as well as in the downlink direction DL. Both the base stations NB1, NB2 as well as other terminals UE each have transmitting/receiving facilities SEE for the signal transmission on the radio interface. Furthermore, the radio network controller also has a transmitting/receiving facility SEE to exchange data and signalings with the base stations as well as the mobile switching center and/or gateways. The terminals UE1, UE2, the base station NB1 as well as the radio network controller RNC also comprise a control facility ST in each instance, with which the method, as is described below, can be implemented.

According to the evolution of the UMTS standard, the component of the radio network controller RNC will no longer exist in the architecture of the system. Instead, the functionalities of the radio network controller RNC are shifted onto the base station as well as the so-called access gateway. Accordingly, subsequent exemplary embodiments which focus on the known UMTS system architecture can be mapped onto the new system architecture.

Figure 2:
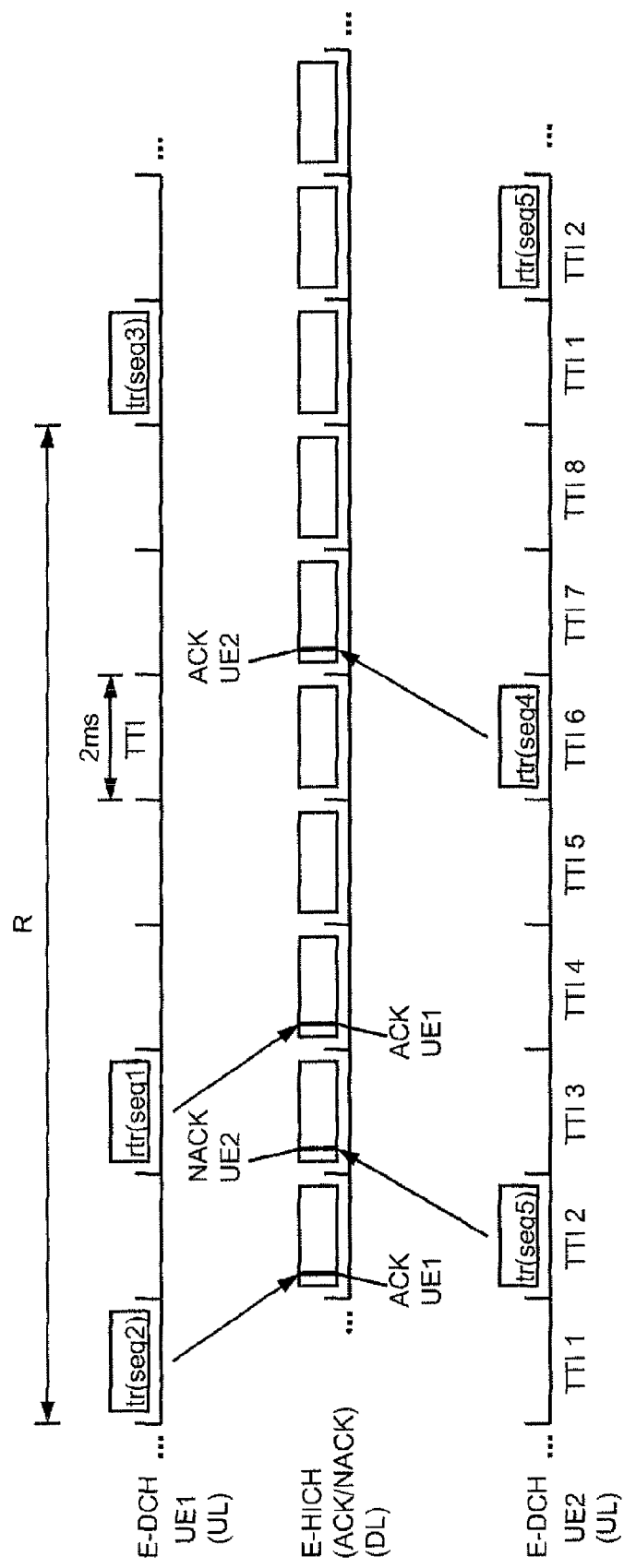

FIG. 2 shows an exemplary situation, in which two terminals UE1, UE2, within the scope of the E-DCH, respectively transmit data packets, for instance VoIP packets, in a respective TTI of 2 ms in the uplink direction UL to the base station NB1. The correct and/or incorrect receipt of the data packets is confirmed by the base station NB1 in the E-HICH in the downlink direction DL, with the confirmation taking place with a known temporal offset of one for instance, as shown by way of example, or several, in any case a number of TTIs known to the terminal. Let us assume that eight TTIs form a frame R in each instance.

In the example, the first terminal UE1 firstly sends a data packet tr(seq2) in a first TTI 1 of the frame R, which is provided in a sequence of a plurality of consecutively transmitted data packets with the sequence number 2 for reestablishing the original sequence on the receive side. In a third TTI 3, the first terminal UE1 also repeatedly sends a data packet rtr(seq1), since, after a first-time transmission of the data packet with the sequence number 1 in the E-HICH, it has received a negative confirmation NACK from the base station NB1. If the first terminal UE1 in the E-HICH receives a positive confirmation ACK as a result of the first-time transmission of the data packet tr(seq2), in the first TTI 1 of the following frame R it sends a data packet tr(seq3) with the corresponding subsequent sequence number 3.

By contrast, the second terminal UE2 firstly sends a data packet tr(seq5) in the second TTI 2 of the frame R and repeatedly a data packet rtr (seq4) in the sixth TTI 6. After receiving a negative confirmation in the E-HICH in respect of the data packet tr(seq5), a repeated transmission of the data packet rtr(seq5) takes place in the second TTI 2 of the subsequent frame R.

For the transmission of the confirmations ACK/NACK of the two exemplary terminals UE1, UE2, the base station NB1 uses an identical signature in the E-HICH control channel. This is enabled by a delayed use of the TTIs of a frame R by the two terminals UE1, UE2. If, as in the example shown in FIG. 2, a confirmation is offset by a TTI in each instance, the first terminal UE1, following the transmission of the data packet tr(seq) in the first TTI 1, knows that the signature assigned to it in the second TTI 2 relates to this transmission. The same applies to all described further transmissions by the terminals UE1, UE2. As all transmissions of the terminals UE1, UE2 do not temporally overlap in the uplink direction in a frame R, ambiguities also do not arise in respect of the receipt of signatures in the E-HICH.

The selection of the TTI of a frame and/or the determination of the number of TTIs, in which the terminals UE1, UE2 are permitted to transmit data packets in the uplink direction, is carried out by the radio network controller RNC. This assigns two so-called HARQ processes (Hybrid Automatic Repeat Request) to each terminal for instance for first-time and repeated transmissions of data packets. These known HARQ processes cause a data packet which has been negatively confirmed by the base station NB1 by a NACK signaling to be repeatedly transmitted by the affected terminal and both the erroneously received first-time transmitted data packet as well as the repeatedly transmitted data packet is used for detection purposes on the receive side. Although according to the prior art up to eight HARQ processes can be assigned to a terminal, an assignment of only two HARQ processes is, in practice, adequate for low-rate services of this type particularly with the transmission of VoIP data with the above-mentioned accumulation of data to be transmitted over a comparatively long period of time.

To enhance the example shown, more than two terminals can herewith also use a common confirmation resource. With for instance eight TTIs and/or HARQ processes per frame and per two assigned HARQ processes per terminal, up to four terminals can use a common confirmation resource, with up to eight terminals consequently per assigned HARQ process. On the part of the radio network controller, the assignment of the TTIs and/or HARQ processes to the terminals can take into consideration here that terminals are not to assign any adjacent TTIs an identical signature if their transmissions were to result in an overlayed receipt of data packets at the base station as a result of large transient time differences, which would in turn result in a simultaneous transmission of confirmations for instance. Since the terminals do not generally transmit synchronously, the instance of receiver-side overlays can occur frequently, and is thus to be considered with the assignment of the TTIs and/or with the formation of groups, which use a common confirmation resource and/or a common signature in the time multiplex.

In the instance that E-DCH transmissions by the terminals are controlled by the supplying base station NB1, the base station can further restrict the number of HARQ processes assigned to a terminal, for instance, and equipped with the knowledge of the temporal control as well of the temporal relations of the terminals in respect of each other can thus ensure that no overlays occur during the transmission of confirmations to several terminals when using the same signature. This temporal control performed by the base station is advantageous here in that complex and time-intensive signalings are not necessary between the base station and the radio network controller.

FIG. 3 shows a further exemplary situation, in which two terminals UE1, UE2 each transmit data packets, for instance VoIP packets, in a respective TTI of 2 ms in the uplink direction to the base station NB1, within the scope of the E-DCH. The correct and/or incorrect receipt of the data packets is confirmed again in the E-HICH by the base station NB1.

Let it be assumed that eight TTIs form a frame R. The respective frames R of the terminals UE1, UE2 as well as of the E-HICH are temporally offset in respect of each other since the terminals UE1, UE2 are not synchronized with one another and thus begin their respective cycle at a different point in time. As the cycles of the terminals UE1, UE2 are displaced in respect of each other in the uplink direction UL, however, only one common cycle exists for the E-HICH channel(s) in the downlink direction, the time interval between the end of a data packet received by the base station NB1 in a TTI of the uplink direction and the start of an E-HICH-TTI to be transmitted, which transmits the corresponding confirmation, is not identical for all terminals. An assignment between the uplink direction and downlink direction TTIs takes place accordingly such that a confirmation can be transmitted at the earliest $\Delta t_{min}$ after the end of the received uplink direction TTI and has to take place in the proximate downlink direction TTI, accordingly at the latest at an interval of $\Delta t_{min}$+length TTI. The minimal distance $\Delta t_{min}$ results here predominantly from a processing duration of the received data packet in the base station and is also known to the terminals UEs.

Both the base station NB1 and also the terminals UE1, UE2 according to FIG. 3 are, as a result of known temporal relations between the relevant uplink and downlink direction channels, able to clearly and concisely determine the allocation between data packets in the uplink direction and confirmations in the downlink direction irrespective of signal transit times.

In the example in FIG. 3, the first terminal UE1 firstly transmits a data packet tr(seq1) in a first TTI 1, which in a sequence of a plurality of consecutively transmitted data packets with the sequence number 1 is provided in order to reproduce the original sequence on the receive side. In a third TTI 3, the first terminal UE1 also firstly transmits a data packet tr(seq2) with the sequence number 2. If the first terminal UE1 receives a positive confirmation ACK in the first TTI 1 of the E-HICH as a result of the first transmission of the data packet tr(seq1), it transmits a data packet tr(seq3) with the correspondingly consecutive sequence number 3 in the first TTI 1 of the following frame R.

By contrast, the second terminal UE2 firstly sends a data packet tr(seq4) in the second TTI 2 as well as a data packet tr (seq5) in the sixth TTI 6 in the uplink direction UL to the base station NB1. Following receipt of a negative confirmation in the second TTI 2 of the E-HICH in respect of the data packet tr(seq4), a repeated transmission of the data packet rtr(seq4) takes place in the second TTI 2 of the subsequent frame R.

For the transmission of the confirmations ACK/NACK of the two terminals UE1, UE2 mentioned by way of example, the base station NB1 uses the same E-HICH control channel, i.e. an identical signature and the same spreading code. This is enabled by a delayed use of the E-HICH-TTIs of a frame R for confirmations ACK/NACK to be transmitted in the downlink direction DL. If, as in the example shown in FIG. 3, the respective data packet transmission of the two terminals UE1 and UE2 take place in different TTIs of a frame R, this also applies to the associated confirmations on the commonly used E-HICH. Each terminal clearly recognizes the confirmations assigned to it as a result of the temporal relationship known to it in respect of the data packets transmitted thereby.

The signatures used for the E-HICH and the E-RGCH mentioned in the introduction allow a larger number of subscribers and/or terminals on a common spreading code (with for instance a spreading factor SF=128) to be individually operated with one information bit. A physical channel with SF=128 can transmit symbols in a so-called slot 20, with QPSK modulation thus 40 bit. This information bit is repeated three times in the three slots of a 2 ms long TTI. A bit position may now be clearly assigned to each terminal in this slot (and/or one bit position per E-HICH and E-RGCH), as a result of which 40 sub channels were defined. This corresponds to a time multiplex within the TTI, as is shown by way of example in FIG. 2.

Particularly in CDMA-based systems, the definition of a fixed bit position can however possibly be disadvantageous as a result of a potentially larger error probability of individual bit positions. Alternatively, a code multiplex can thus also be used, in which each sub channel is characterized by a 40 digit binary signature (a so-called Hadamard code), which are themselves orthogonal in a fashion similar to the spreading code. This results in the spreading factor 128 for each bit being increased by an additional factor 40 and the information of each terminal being distributed over the entire TTI duration, as is shown by way of example in FIG. 3 with the horizontal lines. The alternative embodiment of the code multiplex is described in the technical specification 3GPP TS 25.211 cited in the introduction.

As the processing of signatures takes place on the physical layer (layer 1 according to the ISO/OSI model), these sub channels can also be referred to as physical channels. This means that a physical E-HICH is assigned to each terminal by the combination of spreading code and signature, in contrast to a known shared channel, the assignment of which generally takes place by the so-called MAC layers.

The selection of the TTI of a frame and/or the determination of the number of TTIs, in which the terminals UE1, UE2 are permitted to transmit data packets in the uplink direction UL, is carried out by the radio network controller RNC and/or the base station NB1. In accordance with the embodiments, this assigns delayed subsets of the TTIs of a frame R to the terminals UE1, UE2, to which a common E-HICH is assigned for confirmations. In the example in E-DCH, this is carried out by deactivating one or several of a total of eight so-called HARQ processes (Hybrid Automatic Repeat Request).

Although according to the current standard up to eight HARQ processes can be assigned to a terminal, an assignment of only two HARQ processes is in practice adequate for low-rate services of this type, particularly with the transmission of VoIP data with the above-mentioned accumulation of data to be transmitted over a comparatively long period of time.

Expanding on the example shown, more than two terminals can as a result also use a common confirmation resource. With the exemplary eight TTIs and/or HARQ processes per frame and two assigned HARQ processes per terminal, up to four terminals can use a common confirmation resource, even up to eight terminals in the event of an assigned HARQ process.

In addition to forming an organizational structure, HARQ processes are used for the retransmission of data packets, in other words, the processing of confirmations and the resulting steps such as initiating a retransmission, checking whether a maximum limit has been reached, managing the transmit buffer etc., particularly with the synchronous HARQ protocol of the E-DCH but also as the scheduling unit. This means that so-called grants can be awarded for individual HARQ processes and/or can be excluded (deactivated) for individual HARQ processes. The HARQ processes thus form convoluted subsets of possible transmission time intervals (TTIs) such that a HARQ process i includes the i-th TTI of each frame in each instance.

Transmission confirmations with E-DCH may relate here to all HARQ processes, but are however restricted to specific HARQ processes. The latter is used advantageously with the multiplexes. Terminals, the grants of which are restricted to delayed subsets of HARQ processes, cannot collide in the event of confirmations. It should be noted here that confirmations (which take place in a common cycle for all terminals) are actually transmitted without an overlap in time by the base station in the downlink direction, while this condition does not apply to the corresponding transmissions in the uplink direction due to the TTI cycles which are generally temporally offset. Temporal overlays in the transmissions in the uplink direction do not result here in interferences, provided they can be compensated again by correspondingly different temporal offsets in respect of the cycle of the transmissions in the downlink direction.

Although the E-HICH channel was previously exclusively taken into account, all descriptions likewise apply to the E-RGCH channel as well as to other channels known to the person skilled in the art.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for transmitting data in packets via a radio communications system, comprising:
   transmitting data packets from at least two terminals to a base station, each terminal using different time intervals of a plurality of time intervals in a divided transmission frame of a data channel in an uplink direction; and
   confirming to the at least two terminals, receipt by the base station of the data packets, by sending confirmations of receipt in a control path transmission frame divided by the plurality of time intervals, the confirmations transmitted via a characterized subchannel using an identical signature for the at least two terminals in different time intervals of the control path transmission frame.

2. The method as claimed in claim 1, wherein the data packets of the at least two terminals are transmitted in an identical physical resource without an overlap in time or in a temporally overlaying fashion.

3. The method as claimed in claim 1, wherein the respective time intervals for the transmission of data packets by a radio network controller and/or the base station are assigned to the at least two terminals in a coordinated fashion such that the confirmation of receipt can take place using the identical signature in the different time intervals of the control path transmission frame.

4. The method as claimed in claim 3, wherein the time intervals for transmitting data packets to an identical position in at least two consecutive frames are assigned to at least two terminals.

5. The method as claimed in claim 1, wherein the signatures are orthogonal binary signatures.

6. The method as claimed in claim 5, wherein the orthogonal binary signatures are Hadamard codes.

7. The method as claimed in claim 1, wherein the signatures cause a spreading of the confirmations over a length of transmission of one time interval.

8. A base station of a radio communications system including at least two terminals, comprising:
   at least one transmitting/receiving facility
      receiving data packets from the at least two terminals in different time intervals of a plurality of time intervals in a divided transmission frame of a data channel in an uplink direction, and
      transmitting to the at least two terminals confirmations of receipt of the data packets in a control path transmission frame divided by the plurality of time intervals, the confirmations transmitted via a characterized subchannel using an identical signature for the at least two terminals in different time intervals of the control path transmission frame.

9. The base station as claimed in claim 8, wherein the control facility is configured so as to assign resources to the at least two terminals for the transmission of data packets in the uplink direction and to assign the same resources for the transmission of confirmations in the downlink direction to the at least two terminals.

10. A radio communications system, comprising:
   at least two terminals, each including
      at least one terminal control facility controlling transmission of data packets using resources, and
      a terminal transmitting/receiving facility transmitting data packets in different time intervals of a plurality of time intervals in a divided transmission frame of a data channel in an uplink direction;
   at least one base station including
      at least one base station transmitting/receiving facility receiving the data packets from the at least two terminals and transmitting to the at least two terminals confirmations of receipt of the data packets, and
      a base station control facility controlling transmission of the confirmations of the data packets in a control path transmission frame divided by the plurality of time intervals, the confirmations transmitted via a characterized subchannel using an identical signature for the at least two terminals in different time intervals of the control path transmission frame;
   a radio network controller including
      at least one controller control facility assigning the resources to the at least two terminals, and
      a controller transmitting/receiving facility transmitting assignment of the resources to the at least two terminals and/or the at least one base station.

* * * * *